(12) United States Patent
Multerer et al.

(10) Patent No.: US 12,450,327 B2
(45) Date of Patent: Oct. 21, 2025

(54) CAPABILITY-RESTRICTED SYSTEM CONTROL

(71) Applicant: KRY10 Ltd., Wellington (NZ)

(72) Inventors: Boyd Multerer, Wellington (NZ); Kent McLeod, Sydney (AU); Matthew Brecknell, Kingsford (AU); Ihor Kuz, Waterloo (AU)

(73) Assignee: KRY10 Corp, Karaka Bays (NZ)

( * ) Notice: Subject to any disclaimer, the term of this patent is extended or adjusted under 35 U.S.C. 154(b) by 545 days.

(21) Appl. No.: 17/814,758

(22) Filed: Jul. 25, 2022

(65) Prior Publication Data

US 2024/0028691 A1 Jan. 25, 2024

(51) Int. Cl.
*G06F 12/16* (2006.01)
*G06F 12/14* (2006.01)
*G06F 21/44* (2013.01)
*G06F 21/64* (2013.01)

(52) U.S. Cl.
CPC .......... *G06F 21/44* (2013.01); *G06F 12/1441* (2013.01); *G06F 21/64* (2013.01); *G06F 2221/2143* (2013.01)

(58) Field of Classification Search
CPC .. G06F 12/1483; G06F 12/1491; G06F 12/16; G06F 13/102; G06F 13/16; G06F 13/1663
See application file for complete search history.

(56) References Cited

U.S. PATENT DOCUMENTS

| | | | | |
|---|---|---|---|---|
| 11,399,039 B2* | 7/2022 | Rubin | ................. | H04L 63/1441 |
| 11,664,561 B2* | 5/2023 | Makino | ............... | H01M 50/583 |
| | | | | 429/163 |
| 12,245,030 B2* | 3/2025 | Vanoss | ................. | H04L 9/3297 |
| 2009/0119676 A1* | 5/2009 | Supalov | ................. | G06F 9/544 |
| | | | | 719/312 |
| 2011/0272033 A1* | 11/2011 | Py | ........................ | F16K 15/145 |
| | | | | 137/625.5 |
| 2015/0229629 A1 | 8/2015 | Ishaya | | |
| 2017/0243019 A1* | 8/2017 | Bailey | ................. | G06F 11/0778 |

(Continued)

FOREIGN PATENT DOCUMENTS

| | | | |
|---|---|---|---|
| CN | 117221883 A | * 12/2023 | |
| JP | 4660899 B2 | * 3/2011 | ........... H04L 9/0836 |

OTHER PUBLICATIONS

Extended European Search Report mailed Jan. 12, 2024 for European Application No. 23182873.2, a foreign counterpart to U.S. Appl. No. 17/814,758, 12 pages.

*Primary Examiner* — Khanh Q Dinh
(74) *Attorney, Agent, or Firm* — Lee & Hayes, P.C.

(57) ABSTRACT

Systems and methods are directed to capability-restricted system control. In some embodiments, during the instantiation of a requesting entity in a system, the requesting entity is granted a specific set of capabilities. In these examples, capabilities used by a responding entity to fulfil a request from a requesting entity are limited to the capabilities granted the responding entity by the requesting entity. When granting the capabilities to the responding entity, the granted capabilities are restricted from use by the requesting entity. Once the request is fulfilled by the responding entity, the restrictions on the capabilities are removed, allowing the requesting entity to use those capabilities in a further request.

15 Claims, 9 Drawing Sheets

(56) References Cited

U.S. PATENT DOCUMENTS

| | | |
|---|---|---|
| 2018/0083971 A1 | 3/2018 | Brown |
| 2021/0243208 A1* | 8/2021 | Rubin .................... G06F 21/554 |
| 2021/0342825 A1* | 11/2021 | Le Calvez ............ G06F 21/554 |
| 2022/0286845 A1* | 9/2022 | Vanoss .................... H04W 4/80 |
| 2023/0129353 A1* | 4/2023 | Lin ..................... G06F 16/2386 |
| | | 711/112 |
| 2024/0028691 A1* | 1/2024 | Multerer ................. G06F 21/44 |

\* cited by examiner

CAPABILITY-RESTRICTED SYSTEM CONTROL

BACKGROUND

The market for "connected" devices has grown exponentially in the past several years, the growth of which shows no signs of slowing down. However, there have been some limitations with that growth in various sectors of the marketplace. For example, manufacturers of some smaller, or "light," devices without a central processing unit (CPU), such as an appliance, some controllers, and the like, have been hesitant to integrate a computing-platform to their products. Connected devices can be worth more than the sum of their parts. These devices are valued by the job that they do and the problem that they solve. If they stopped working, either due to unhandled errors or a ransomware attack, the cost may be significant. That job is usually worth much more than the device itself. They are also valued by the cost to maintain and replace them. If a truck needs to roll to maintain a device, then it is already high value. If it is in orbit, then its inherent value is higher still.

A perceived or real lack of real security can be a serious impediment to adoption of the current Connected Device platforms. We must treat all connected devices as high value to somebody and high value to some attacker. Serious security that goes all the way down to the hardware and up to the top of the services is simply a hard requirement. As an example, think about the cost involved if a car's software is hacked. The manufacturer needs to be able to deploy secure upgrades to every vehicle. If the car needs to go into the shop, then that is prohibitive. It is much better design both robust defenses and remote upgrade systems up front and integrate them deeply into the stack.

The software stacks that are currently used to build Connected Devices come from PCs and Servers. Macro-Kernel OS designs (where drivers are loaded into the Kernel) have been great for performance in PCs and Servers. Web servers and networked databases scale well to internet style results and improve availability by spreading risk across clusters of machines. Connected Devices, on the other hand, rarely have physical security, are often single machines with no physical fail-over options and may have only intermittent connectivity to the network. Connected Devices need to be robust in ways that Servers and PCs don't often need. When an error on a device occurs, it needs to limit the damage and keep as much of the machine running as possible while the failing piece of software is recovered—even if that was a driver. This means structuring both the OS and application model in ways that naturally limit the damage a fault or an attack can do, no matter where it is in the stack.

On the other hand, if a critical error occurs in critical parts of a server, there are others in the cluster that can handle load while that one is restarted. PCs are a little closer but have still made the choice to increase performance at the price of risk. Incidentally, data-center oriented compute is also wrestling with the legacy of PC oriented architectures applied to problems where it is no longer appropriate. That problem space has more momentum to clean it up due to scale requirements in the cloud. The Connected Devices world will go through a similar transformation and Kry10 intends to be there making it happen.

The state of the computer industry's response to errors is still to turn the device off and on again. This may have worked for PCs back in the day but leads to many reliability issues and is incompatible with our connected world. Software and Hardware both need to be built with the goal of running forever and being able to recover from errors without having to be reset. In other words, PC oriented architectures, including operating systems, are simply not fit for purpose in the connected world.

Manufacturers are the current drivers of platform choices. Each device, or at least each brand of devices, is its own walled garden. Owners of fleets of devices that may have been purchased from market suppliers find that they aren't really compatible with each other. For example, a truck servicing utility infrastructure will be fitted with sensors, tools and other equipment from multiple manufacturers. The operation engineers at the utility need to monitor the status of the truck as a whole and would rather not have to monitor dashboards and indicators from each manufacturer via separate tools. Note: this is something we've specifically heard from utility operators.

The lack of interoperable management makes the deployment owners' jobs much more difficult. These are the final customers that pay for everything! What is best for them is, by definition, best for the industry. Today, device manufacturers do not prioritize ease of use for the end user, causing high friction for adoption and slowing the growth of the market. For any platform to succeed in this market it must have opinions and take a stand for what is best for the end user.

There is a desire amongst those studying connected devices to find examples of deployments containing millions of identical devices. Software developers have grown accustom to platforms with billions of clients in the forms of phones or web browsers. These searches for very large deployments of homogeneous connected devices have largely failed. Instead, we find millions of deployments of thousands of devices. Software developers have to reset their thinking and accept that connected devices are diverse in both hardware (sensors) and software (business logic and drivers). The underlying systems can be reused to form a platform, but it must be designed for adaptability and customization.

Accordingly, there is a need to improve the capability and security of connected devices.

SUMMARY

Various aspects of the presently disclosed subject are directed to capability-restricted system control. In some embodiments, during the instantiation of a requesting entity in a system, the requesting entity is granted a specific set of capabilities. In these examples, capabilities used by a responding entity to fulfil a request from a requesting entity are limited to the capabilities granted the responding entity by the requesting entity. When granting the capabilities to the responding entity, the granted capabilities are restricted from use by the requesting entity. Once the request is fulfilled by the responding entity, the restrictions on the capabilities are removed, allowing the requesting entity to use those capabilities in a further request.

In some examples, a method is described. The method includes, instantiating, in a mathematically verified system, a client, a message server, and a server by an application manager, the client having a first contiguous block of untyped memory as a client node, the client node having untyped capabilities; generating, by the client, a message for a server, the message comprising a request to the server and a token; copying the message from the client node to a first shared node, the first shared node shared between the message server and the client and assigning a use of a set of capabilities from the client node to the message server, wherein the client retains ownership of the set of capabilities and the message server is given a use of the set of capabilities; communicating with the message server that the message is in the first shared node and that the use of the set of capabilities is given to the message server; verifying that the client has an authority to communicate with the server by verifying the token in a token table; upon verifying that the client has the authority to communicate with the server: copying the message into a second shared node, the second shared node shared between the message server and the server; and assigning the use of the set of capabilities to the server to allow the server to perform a function in response to the message; and communicating with the server that the message is in the shared second node for the server. As used herein, a "client node" is a node that has access to untyped capabilities.

In another aspect, a computer-readable storage medium having computer-executable instructions thereon, which when executed by a computer perform the steps to instantiate, according to instructions from a first manifest, a client, a message server, and a server by an application manager, the client having a first contiguous block of untyped memory as a client node, the client node having untyped capabilities; receive a notification of a second manifest to be downloaded, the second manifest comprising an updated version of the client; download the second manifest; clear the first contiguous block of untyped memory while maintaining the message server and the server; load the updated version of the client into the erased first continuous block of untyped memory; and re-instantiate the updated version of the client in the first contiguous block of untyped memory. In several aspects of the presently disclosed subject matter, a server, including a message server, may set up its own shared node with its own untyped memory. For example, a shared node with its own untyped memory may be setup by the server to be used between the server and the message server.

In a still further aspect, a system is described, the system including a memory storing computer-executable instructions; and a processor in communication with the memory, the computer-executable instructions causing the processor to perform acts comprising instantiate a mathematically verified kernel; instantiate a root server and a message server; instantiate an application manager; download a manifest into the application manager, wherein the application executed the instructions in the manifest to: instantiate a first application and assign the first application a first block of contiguous untyped memory of the memory; instantiate a second application and assign the second application a second block of contiguous untyped memory of the memory; establish communication connections between the first application and the message server, and between the message server and the second application; and issue a token to the first application, wherein the token is used by the message server to verify that a message from the first application is authorized to be received by the second application. In some examples, the application manager, rather than the root manager, may instantiate a message server.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
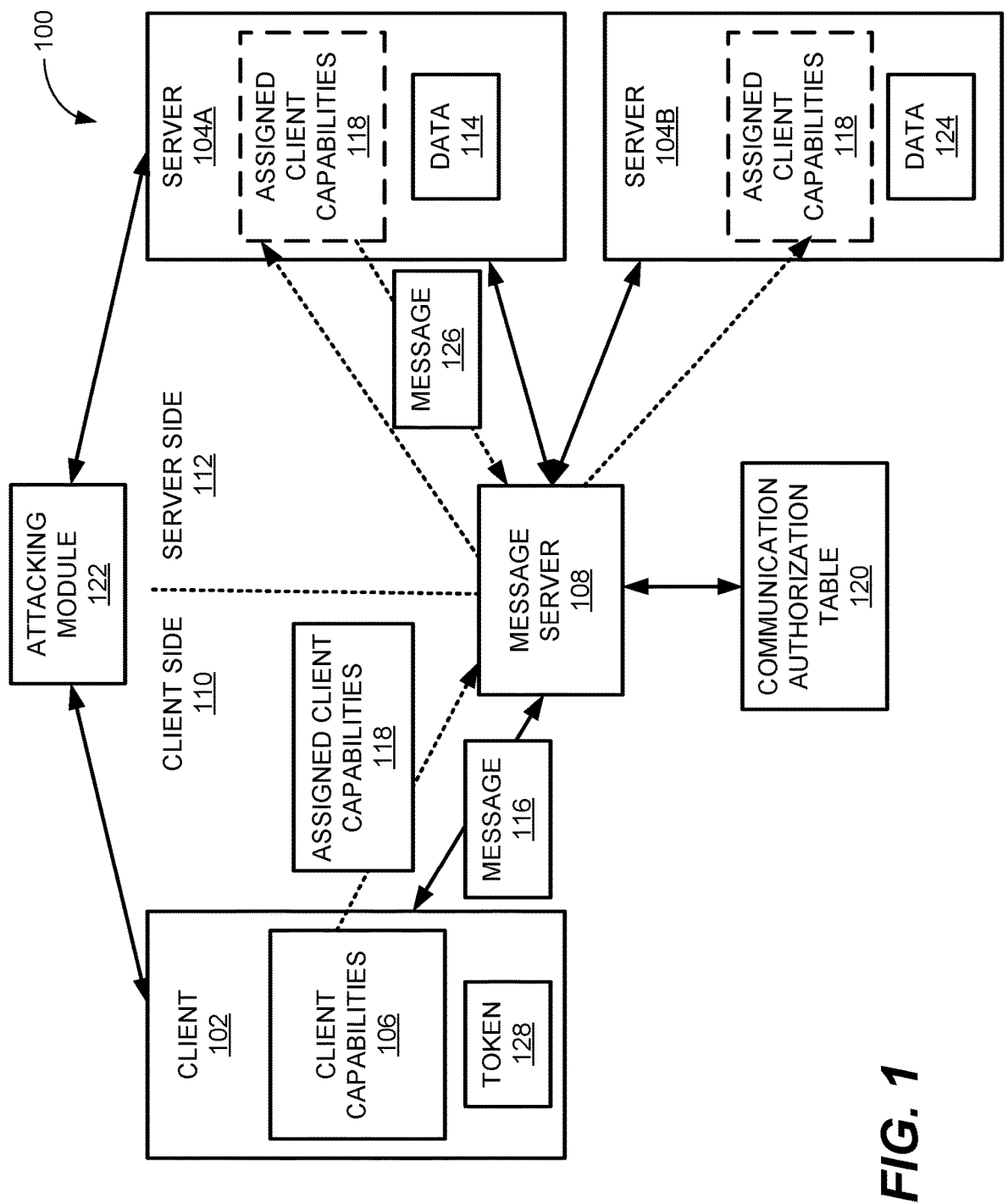
FIG. 1 is a system for capability-restricted system control, in accordance with some examples of the present disclosure.

Wherever possible, the same reference numbers will be used throughout the drawings to refer to the same or like parts. FIG. 1 is a system 100 for capability-restricted system control, wherein responding entities can processes requests by requesting entities only if given capabilities of the requesting entity by the requesting entity, and only to the extent of the granted capabilities. As used herein, an "entity" can be a program, module, client, hardware, software, firmware, or combinations thereof. Further, as used herein, a "requesting entity" requests some form of information or data and a "responding entity" provides some form of information or data in response to a request from a requesting entity. As used herein, a "capability" is a permission to access an entity or object in a system.

Security and operational issues often arise in systems when control of entities is taken over improperly or if a default of an entity affects that entity or other entities. In conventional systems, attacks on system capabilities can occur by using "backdoors" that can be vulnerable entry points to a system. Some of these backdoor attacks include the use of spyware, ransomware, and distributed denial of service (DDoS) attack. Because responding entities in conventional systems have their own capabilities assigned regardless of the presence of a request from a requesting entity, a malicious program or fault can use those capabilities to propagate and expand an attack on the system beyond the entry point of the attack. In the same way, a faulting entity may cause errors in other entities, resulting in a potential chain reaction and expansion of the default, potentially culminating in the complete takeover of the system or a shutdown of the system.

In a different manner, the system 100 of FIG. 1 uses a capability-restricted system control scheme. Illustrated in FIG. 1 is client 102, as well as, server 104A and server 104B. Client 102 is a requesting entity in FIG. 1, whereas servers 104A and 104B are responding entities. However, it should be understood that the designation of a "requesting entity" or "responding entity" may be temporary, as a responding entity itself may become a requesting entity, and a requesting entity may become a responding entity. For example, if client 102 transmits a request to server 104A, server 104A may determine that the request requires at least some capabilities of server 104B, and therefore, may become a requesting entity to request capabilities of server 104B.

In FIG. 1, client 102 has client capabilities 106. Client capabilities 106 are assigned to the client 102 upon the instantiation of the client 102. Client capabilities 106 can include untyped memory assigned to the client 102 upon the instantiation of the client 102. As used herein, "untyped memory" is a block of contiguous physical memory with a specific size. As used herein, "contiguous" is used to denote memory blocks that are in well-known memory positions and do not move to other memory positions. Contiguous memory blocks may have sequential or non-sequential memory addresses, the presently disclosed subject matter is not limited to either configuration. Untyped capabilities are capabilities to untyped memory. Untyped memory can be retyped into kernel objects together with capabilities to them, or into further, usually smaller, untyped memory. In some examples, all of the capabilities of the client capabilities 106 is termed the "capability space." If partitioned, capabilities can be associated as a capability node, which is an array of capabilities. These capabilities can be listed in a table, sometimes referred to herein as a "capability table." These and other specific aspects of capabilities are explained in more detail in FIG. 2 and the following figures.

Returning to FIG. 1, a message server 106 coordinates communication between client 102 on client side 110 and servers 104A and 104B on server side 112. The client side 110 and the server side 112 are not logical or functional partitions within the message server 108, but rather, are used to illustrate that the message server 106 handles message requests in a manner that essentially splits the message server 108 into a part that services the clients on the client side 110 and the servers on the server side 112. To explain in more detail, an example communication process is described. In this example, client 102 is a computing process that requires data from the server 104A on a periodic or asynchronous basis. The data provided by the server 104A can be used by the client 102 for various reasons, the specifics of which are not limiting to the presently disclosed subject matter.

In conventional systems, the client 102 transmits a message 118 to the message server 108. The message server 108 in turn transmits the message to the server 104A. However, as noted above, the system 100 uses capability-restrictions to effectuate one or more security and/or system stability protocols. As explained in more detail in FIG. 3, the client 102 may be assigned a token 128 that authorizes the client 102 to communicate with the server 104A and/or 104B. Therefore, in the present example using the system 100, the client 102 determines that the client 102 requires data 114 from the server 104A. Therefore, in order to cause the server 104A to provide the data 114, the client 102 has to allocate some or all of the client capabilities 106 in order to cause the message server 108 to deliver the request for the data 114. Thus, in system 100, the client 102 assigns assigned client capabilities 118 to the message server 108. The message server 108 access a communication authorization table 120 to determine if the client 102 has been authorized by the system 100 to communicate with the server 104A.

If the client 102 is authorized to communicate with the server 104A, the message server 108 assigns the assigned client capabilities 118 to the server 104A. During the time that the assigned client capabilities 118 exist, e.g., during a request, the client 102 does not have the use of the assigned client capabilities 118. The assigned client capabilities 118 are still technically part of the client capabilities 106, but use of the assigned client capabilities 118 first transfers to the message server 108 and thereafter to the server 104A. Thus, while the assigned client capabilities 118 exist, the client 102 must wait until the assigned client capabilities 118 are reassigned to the client 102 or otherwise come back to the use of the client 102, e.g. a fault occurs, etc.

The removal of the assigned client capabilities 118 for use by the client 102 reduces or eliminates the potential for an attack. For example, an attacking module 122 may be a set of code that is designed to try to use the client 102 in a manner that destabilizes the system 100. If the client 102 has assigned the client capabilities 106 to the server 104A by the assigned client capabilities 118, any attack by the attacking module 122 will have to wait until the assigned client capabilities 118 returns to the use of the client 102 as its client capabilities 106. As noted above, the message server 108 does not transmit communications or requests to servers 104A and/or 104B unless the message server 108 receives the assigned client capabilities 118. Further, the extent of any attack is limited to the client capabilities 106, as the client 102 is limited in its requests to the client capabilities 106, Additionally, even if the attacking module 122 were to attack at a time that the client 102 had full access and use to the client capabilities 106, the message server 108 will still only transmit a communication that is authorized under the communication authorization table 120. Thus, in the system 100, attacks by malicious code, such as the attacking module 122, are limited in scope, time, and impact.

Returning to the prior example, once the server 104A has received the assigned client capabilities 118 from the message server 108, the server 104A can use those assigned client capabilities 118 to perform various functions, such as a reading of a sensor to determine the data 114. Unless the server 104A has the assigned client capabilities 118, the server 104A will not perform functions in response to a client request, such as the message 116. Thus, if rather than attacking the client 102, the attacking module 122 attacks the server 104A, if the server 104A does not have any client capabilities assigned to it, such as the assigned client capabilities, 118, the server 104 will remain idle and not process requests from the attacking module 122. As the server 104A can only respond if the server 104A has assigned client capabilities 118, can only act to the extent of capabilities in the assigned client capabilities 118, and only while the assigned client capabilities 118 are assigned to the server 104A. Thus, if attacks are attempted directly on the server 104A, the attacks are limited in scope, time, and impact.

As noted above, the server 104A may act as both a responding entity and a requesting entity, in some examples. In the example in FIG. 1, the server 104A has received the assigned client capabilities 118 from the message server 108 in response to the message 116 from the client 102. However, in this example, the server 104A may need data 124 in order to generate the data 114 in response to the message 116. Thus, the server 104A contacts the message server 108 through message 126 and transfers some or all of the assigned client capabilities 118 to the message server 108. The message server 108 accesses a communication authorization table 120 to determine if the server 104A is authorized to make requests to the server 104B. If the message server 108 using the communication authorization table 120 determines that the server 104A is authorized to make requests to the server 104B, the message server 108 assigns the assigned client capabilities 118 assigned from the server 104A to the server 104B. The server 104B processes the message 126 and generates the data 124. The data 124 is provided to the server 104A, which in turns provides the data 114 to the client 102 through the message server 108. As noted above, the system 100 of FIG. 1 is designed to limit the ability of applications, such as the client 102, to use more capabilities than that which are assigned to it, illustrated in more detail in FIG. 2, below.

Figure 2:
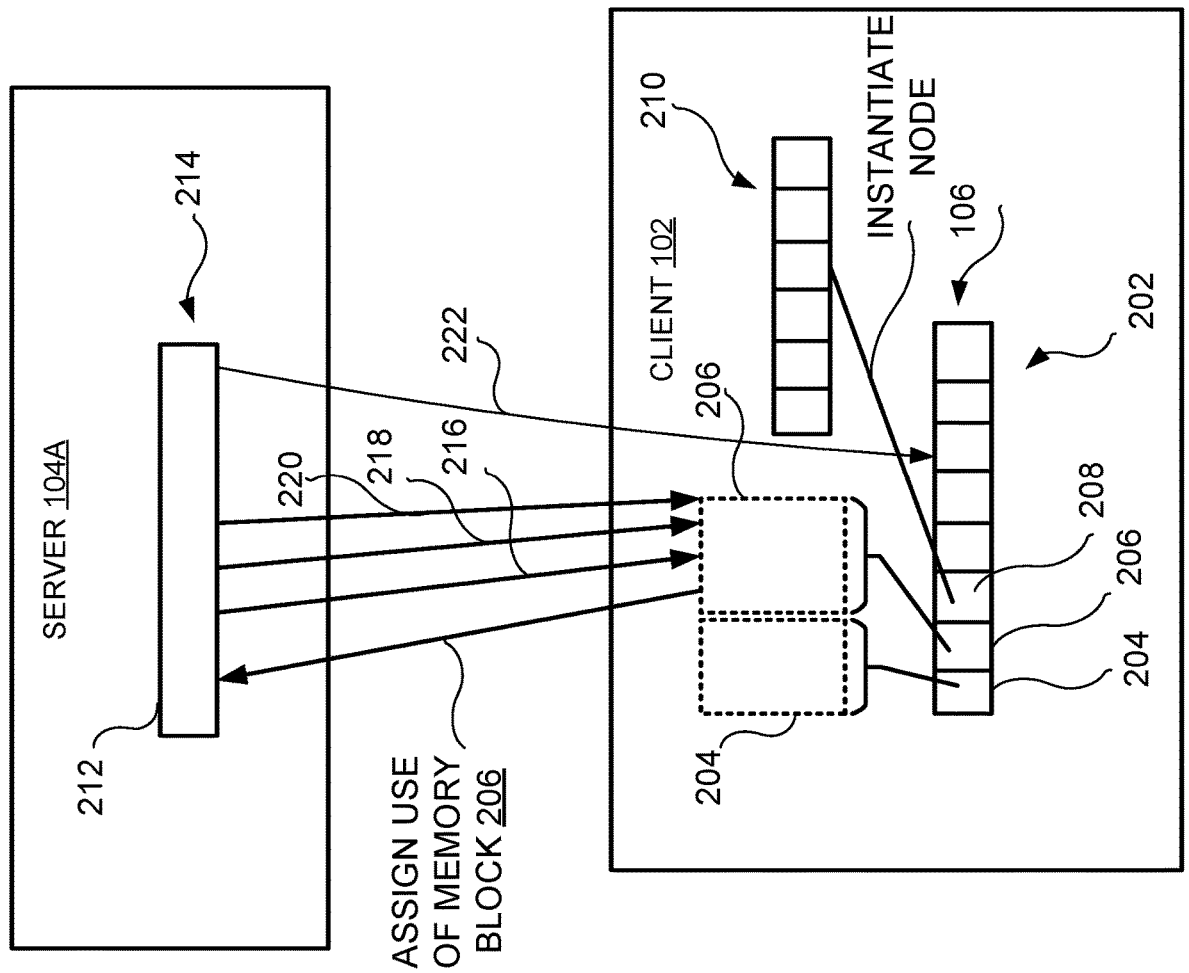
FIG. 2 illustrates an example of how a client shares capabilities with a server, in accordance with some examples of the present disclosure.

FIG. 2 illustrates an example of how the client 102 shares capabilities with the server 104A. In FIG. 2, the client capabilities 106 are illustrated as a node 202. The node 202 includes a block of contiguous memory in a system, illustrated as blocks in the node 202, such as memory block 204, memory block 206, and memory block 208. In FIG. 2, a message server, such as the message server 108 of FIG. 1, is not illustrated for the purposes of simplicity, but will be explained in more detail in FIG. 3, below. In FIG. 2, the node 202 is a block of untyped memory, whereby the client 102 can use the node 202. The client 102 can use blocks of the untyped memory in the node 202 to instantiate resources such as threads, pages, other nodes, and the like. For example, the client 102 can instantiate a node 210 using the memory block 208.

To facilitate communication between the client 102 and the server 104A, the client 102 assigns use of the memory block 206 to a memory block 212 of a node 214 of the server 104A. When the client 102 assigns the use of the memory block 206 to the server 104A, the client 102 maintains "ownership" of the memory block 206. Meaning, the memory block 206 is still part of the node 202 of the client 102. However, the use of the memory block 206 is now with the server 104A. Once the client 102 assigns use of the memory block 206 to the server 104A, the client 102 is not able to access the contents of the memory block 206. It should be noted that the client 102 can assign multiple memory blocks rather than just one, as the singular memory block 206 is merely for purposes of illustration.

After being assigned use of the memory block 206 of the node 202 by the client 102A, the server 104A has use of the memory block 206 to instantiate various capabilities in order for the server 104A to perform the request(s) that the client 102 may send through the message 116. Thus, after receiving the use of the memory block 206, the server 104A instantiates capabilities 216, 218, and 220 into the memory block 206. As discussed before, the client 102 maintains ownership of the memory block 206, but does not the ability to access what the server 104A instantiates using the memory block 206. The server 104A can use the memory block 206 to instantiate a thread, scheduling time, pagers of memory for use by the server 104A, and the like. In sum, the server 104A uses the memory block, 206 to instantiate the capabilities the server 104A needs to perform actions required by the client 102.

Along with the capabilities instantiated in the memory block 206, the server 102A also instantiates a shared memory block 222. The shared memory block 222 is the manner in which the server 104A communicates with the client 102. The server 104A, when processing the message 116, uses the shared memory block 222 by writing information to the shared memory block 222. The client 102 and the server 104A share the information in the shared memory block 222, though only the server 104A may write information into the shared memory block 222. It should be noted that the shared memory block 222 is part of the memory block 206, and thus, while the server 104A has control over what information is placed in the shared memory block 222, the actual ownership of the shared memory block 222 resides with the client 102.

Figure 3:
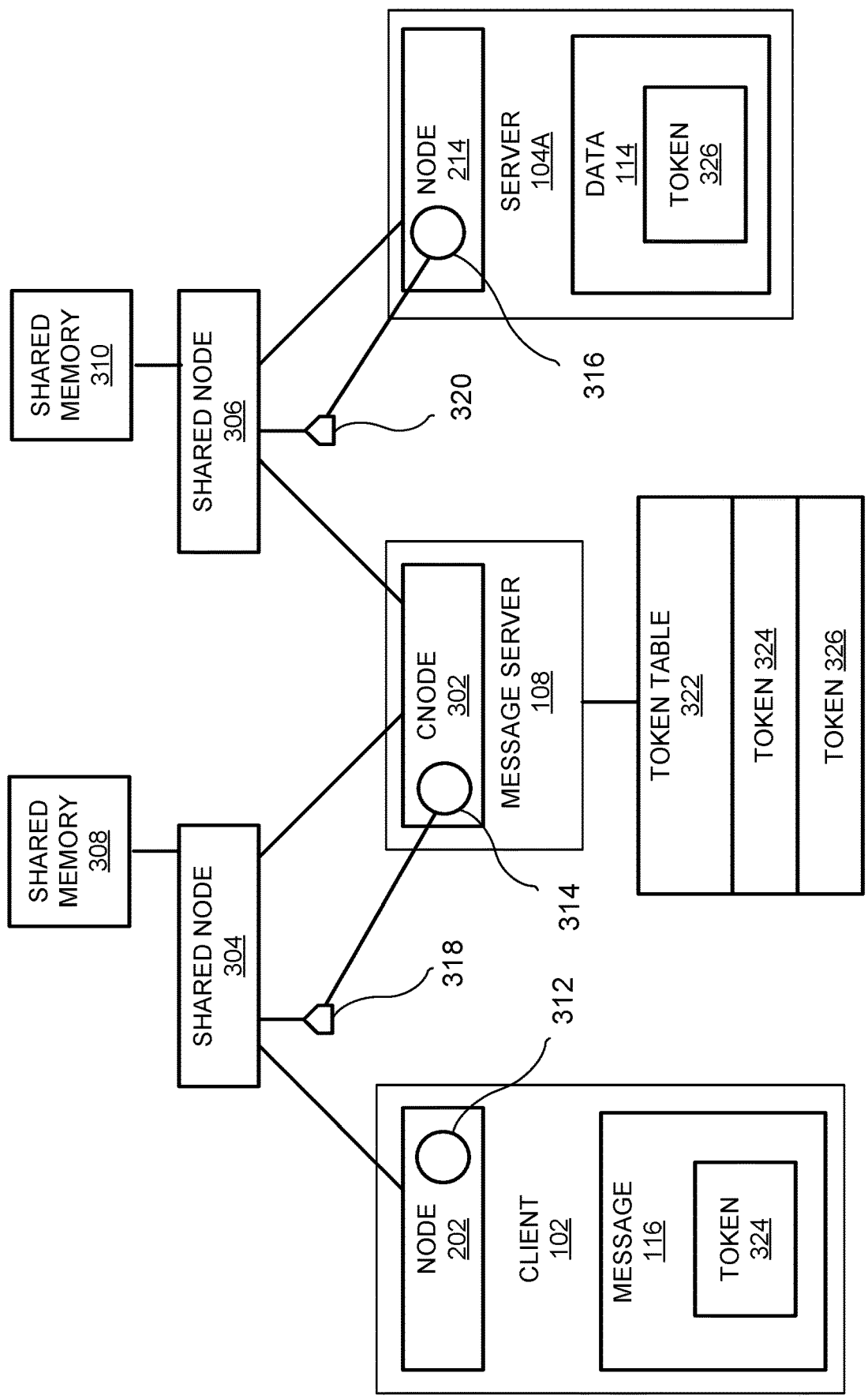
FIG. 3 is an illustration showing a message being transmitted from the client through the message server and to the server, in accordance with some examples of the present disclosure.

While FIG. 2 illustrates the general technology of client/server communication, FIG. 3 is an illustration showing the message 116 being transmitted from the client 102 through the message server 108 and to the server 104A, and the return of the data 114 relating to that message 116. In FIG. 3, illustrated are the node 202, assigned to the client 102, and the node 214, assigned to the server 104A. Further illustrated is the node 302 assigned to the message server 108. As with the node 202 and the node 214, the node 302 is a contiguous block of untyped memory assigned to a specific application, in this instance, the node 302 being assigned to the message server 108 in the manner that the node 202 is assigned to the client 102 and the node 214 is assigned to the server 104A. The nodes 202, 214, 302, 304, and 306 are each assigned contiguous blocks of untyped memory by an application manager (not illustrated), explained in more detail in FIG. 6, below.

Returning to FIG. 3, the shared nodes 304 and 306 are nodes used to facilitate the communication between the client 102 and the message server 108, and between the message server 108 and the server 104A. In this example, the client 102 does not communicate directly with the server 104A (as was illustrated by way of example in FIG. 2). In the configuration of FIG. 3, the message server 108 acts as a broker or interface between the client 102 and the server 104A. The message server 108 acts as a broker through the use of threads, endpoints, and tokens. As used herein, a "thread" is an execution context that manages processor time. As used herein, an "endpoint" is a kernel object that acts as a communication port, whereby invocations on endpoint (objects) are used to send and receive messages. As used herein, a "token" may include various objects, including a thread or string. In some examples, a token is an integer and is assigned by the message server 108, although other variations such as assignment using a manifest may be used and are considered to be within the scope of the presently disclosed subject matter.

In FIG. 3, the node 202 has a thread 312 operating within the client 102. The node 302 has a thread 314 operating within the message server 108. The node 214 has a thread 316 operating within the server 104A. The threads 312-314, when executed, indicate that the particular object (the client 102, the message server 108, and/or the server 104A) are executing (i.e. using processor time). The threads are initiated or blocked using endpoints 318 and 320, as provided in the following example. In the present example, the client 102 creates the message 116 intended for the server 104A to act upon. The message 116 can be any type of message, such as a request for data, status, a status change, and the like. For example, the client 102 can be a flight controller of a drone, and the server 104A is a positional sensor. The client 102 may want an update as to the position of the drone, and therefore, the message 116 in this example can be a request for a position. As stated above, however, the message 116 can be of various types, of which the presently disclosed subject matter is not limited to any particular type.

Returning to the prior example, at the time of the generation of the message 116, the thread 312 is executing, while the thread 314 and the thread 316 are blocked. As used herein, a blocked thread means a particular entity is not using processor time for a particular function. However, some processor time may be used to maintain the instantiation of the entity. The client 102 transmits the message 116 to the message server 108 through the endpoint 318 and copying the message 116 into the shared memory 308. The contact through the endpoint 318 unblocks the thread 314 of the message server 108 and blocks the thread 312 of the client 102. Therefore, at this point in the process, the client 102 and the server 104A are at "rest" or are in standby, whereas the message server 108, because the thread 314 is now unblocked, is now executing. The message server 108 receives the message 116 and proceeds to verify the authority of the client 102 to send the message 116 to the server 104A. Instantiation may be executed by various entities, including through a manifest. The presently disclosed subject matter is not limited to any particular entity from which an instantiation operation is executed.

The message server 108 verifies the authority of the client 102 to send the message 116 to the server 104A by using a token table 322. It should be noted that in some examples, the message server 108 may not very the authority of the client 102, or in other examples, may verify the authority of the client 102 using other technologies. The token table 322 is merely an example. As illustrated in FIG. 3, the message 116 includes a token 324. The token 324 is a piece of data that is gives permission to make message calls as well as indicates other limitations or permissions. For example, the server 104A may have given the client 102 permission to communicate with it and set limitations on message size, the type of requests, frequency of requests, and the like. The permissions and limitations are established and set forth in a token issued by the server 104A. It should be noted, however, that the tokens in the token table 322 may be generated by other entities than the server 104A. The token 324 is saved in the token table 322.

When transmitting messages to the server 104A, the client 102 includes the token 324. The message server 108 receives the message 116 with the token 324. The message server 108 checks the token 324 and the message 116 using the token table 322 and verifies that the client 102 is authorized to communicate with the server 104A and that the message 116 is in a format (i.e. size, type, etc.) expected by the server 104A. If the message server 108 determines that the message 116 is in compliance with the token 324, the message server 108 copies the message 116 from the shared memory 308 to the shared memory 310 and sends a notice through the endpoint 320 that the message 116 is in the shared memory 310. The message server 108 also as part of the notice sends the token 326. The token 326 is used to indicate to the message server 108 that the response from the server 104A is in response to an action by the message server 108 and not some other process. Sending the notice through the endpoint 320 starts the thread 316 of the server 104A and stops the thread 314 on the message server 108. Therefore, at this point in the process, the threads 312 and 314 are stopped, meaning the client 102 and the message server 108 are in standby or are idle.

After receiving the notice from the message server 108, the server 104A acts on the message 116 and generates the data 114. The server 104A copies the data 114 to the shared memory 310 and transmits a response to the message server 108 through the endpoint 320. This causes the thread 316 to stop, placing the server 104A back into an idle or standby state. The thread 314 of the message server 108 is started by the communication to the endpoint 320. The message server 108 receives the data 114, which includes the token 326 issued by the message server 108 in the prior communication from the message server 108 to the server 104A. The message server 108 verifies the token 326 and the data 114 using the token table 322. Upon a verification, the message server 108 copies the data 114 from the shared memory 310 to the shared memory 308 and includes the token 324. The message server 108 sends a notice to the client 102 that the data 114 is in the shared memory 308 through the endpoint 318. Using the endpoint 318 causes the thread 314 to stop and the thread 312 to start. This places the message server 108 into an idle or standby state and the client 102 into an active state.

In some examples, the modules, operations, and the like described in FIG. 3 may be executed on different computers, processors or cores. For example, the message server 108 may communicate with a second message server (not illustrated) in a second computer, processor, or core, whereby the second message server communicates with the node 214.

As discussed above, the client 102 acts in a capability-restricted manner. Thus, several of the capabilities used by the message server 108 and the server 104A are from the node 202 of the client 102, as explained in FIG. 2. For example, if node 202 is taken down or otherwise placed out of service, the shared nodes 304 and 306, as well as the shared memory 308 and 310, may also be taken down, as they are capabilities that exist within the node 202 and are "loaned" for use by the message server 106 and the server 104A. However, in order to facilitate the use of untyped memory by the client 102 as the source of capabilities of other entities in a system, it can be important to ensure that the contiguous block of memory assigned to the client 102, i.e. the node 202, is known and certain to an operating system executing the various functions. In one example, predesignated memory locations for specific applications (such as clients, servers, etc.) are used, as explained in more detail in FIG. 4.

Figure 4:
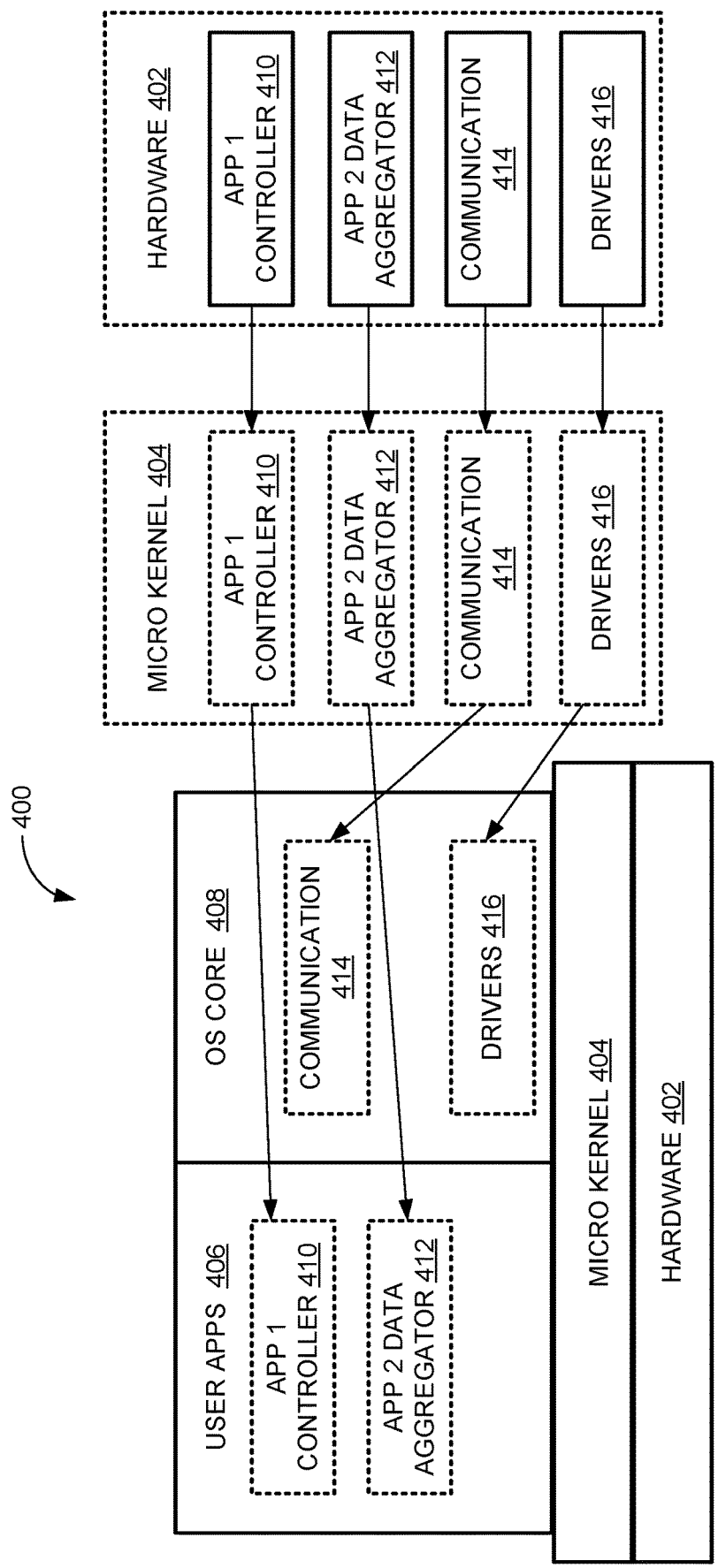
FIG. 4 is a computing platform showing the use of predesignated memory locations for nodes of applications, in accordance with some examples of the present disclosure.

FIG. 4 is a computing platform 400 showing the use of predesignated memory locations for nodes of applications. The computing system 400 of FIG. 4 includes hardware 402, a micro kernel 404, user applications 406, and an operating system core 408. The hardware 402 includes, but is not limited to or must include, a motherboard, central processing unit (CPU), memory, and an input/output interface. The computing platform 400 includes the micro kernel 404. In some examples, the micro kernel 404 is a portion or modular part of an operating system kernel that implements basic features. In some examples of the micro kernel 404, the user services and kernel services are implemented in different address spaces. The user services are kept in user address space, and kernel services are kept under kernel address space.

As noted above with respect to FIG. 3, memory allocated to the applications, such as the client 102, the server 104A, and the message server 108, are mapped to specific locations of contiguous memory in the hardware 402, illustrated by arrows from the mapped location in the hardware 402 to respective applications. Shown in FIG. 4 are application 1 controller 410 and application 2 data aggregator 412, exposed for use in the user apps 406 space of the system 400. Further illustrated in the OS core 408 are communication 414 and drivers 416. In the hardware 402, the application 1 controller 410, the application 2 data aggregator 412, the communication 414, and the drivers 416 are illustrated with solid line borders. This is to illustrate that each of the aforementioned applications are assigned a single, contiguous block of untyped memory. No other application uses the same region of contiguous memory of the hardware 402 assigned to the application unless the hardware 402 or the system 400 in general is rebuilt, in some examples.

The assignment of contiguous blocks of memory to specific applications, without overlap or change, provides various advantages. For example, if the application 2 data aggregator 412 faults or is taken offline, the entire memory space of the application 2 data aggregator 412 can be overwritten and cleaned out, and reloaded with a new instantiation of the application 2 data aggregator 412 with little to no concern that the memory wipe will cause further issues. The damage or effect of a fault, attack, or failure of the application 2 data aggregator 412 is limited to the memory space in the hardware 402.

In another example, an application can be updated without taking the entire system 400 offline. For example, if a new version of the application 1 controller 410 is ready to be loaded, the system 400 takes application 1 controller 410 offline, clears the memory location of the application 1 controller 410 in the hardware, and then rewrites to that previously assigned, contiguous block of memory the new version of the application 1 controller 410. The application 1 controller 410 is reinitiated and continues to operate.

A still further example of an advantage of using specific, assigned contiguous blocks of memory for specific applications is that doing so keeps a system optimized and defragmented. As noted above with respect to FIGS. 1 and 2, when an application, such as the client 102, desires for a server, such as the server 104A, to perform an operation on behalf of the client 102, the client 102 must assign some of its assigned memory to the message server 108 and the server 104A. Otherwise, the message server 108 and the server 104A will not perform any action. When the application stops, faults, or otherwise ceases to operate, requiring a restart of the application, the contiguous memory assigned to the application is cleared (or wiped). However, because the application would have needed to assign memory to cause other entities to operate on its behalf, those pointers from the application's node (or memory space) are also deleted. Thus, when an application's memory space is cleared, this also clears points from its memory space that may be used or in use by other entities. Thus, there are no memory spaces after the clearing that are fragmented or left without an application being assigned to it.

There are various technologies that may be used to generate known, assigned, and contiguous blocks of memory in the hardware 402 that are maintained and persisted throughout the operation of the system 400. One technology is to use a proven kernel or operating system. In some examples, a "proven" kernel is a kernel that has been mathematically verified as being correct against its specification, has been proved to enforce strong security properties, and if configured correctly its operations have proven safe upper bounds on their worst-case execution times. There are various levels of proof. In the current example, the micro kernel 404 is proven against its specification. This means that, during operations, the system 400 knows that the contiguous, assigned memory locations of each application will remain with each application and will not be broken up or assigned to another application.

In some examples, the user apps 406 level is untrusted. As used herein, "untrusted" means that applications running in the user apps 406 application levels only have limited, if any, access to core resources. As noted above, for example, the application 1 controller 410 has access to, at most, the memory allocated to the application 1 controller 410. In another example, applications running in the OS core 408 level are trusted, but isolated. As used herein, "trusted" means that the application has more access to resources than the untrusted application, but its reach of resources is isolated and only extends within a space assigned to it. As noted above, the micro kernel 404 is trusted. In the system 400, the message server 108 is the communication 414 module. Various capabilities may be enforced by the micro kernel 404 but are managed by the message server 108. Thus, while the message server 108 has access to capabilities, the capabilities are only managed by the message server 108, but not enforced. The creation of these capabilities and permissions are described in more detail in FIG. 5.

Figure 5:
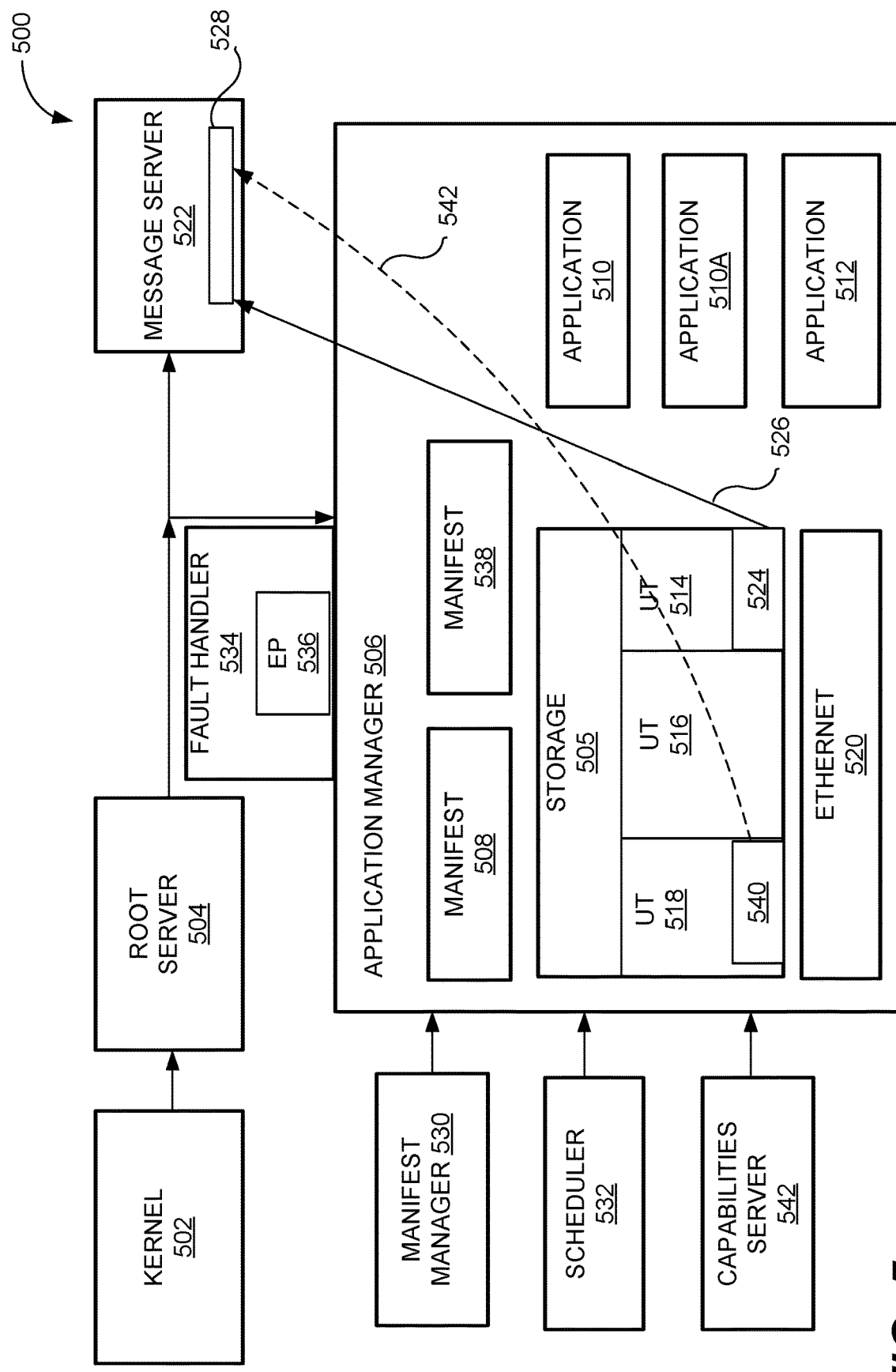
FIG. 5 is a module diagram of a system showing the process of creating applications and the ability for those applications to communicate with each other, in accordance with some examples of the present disclosure.

FIG. 5 is a module diagram of a system 500 showing the process of creating applications and the ability for those applications to communicate with each other. In FIGS. 1 and 2, it was discussed that applications (such as the client 102 and the server 104A) are assigned specific blocks of untyped memory space. FIG. 5 shows that process and others. In FIG. 5, when a machine, such as the system 400 of FIG. 4 is booted, a kernel 502 is instantiated and creates a root server 504. The kernel 502 can be part of the micro kernel 404 of FIG. 4 or may be another part of a kernel loaded into the hardware 402. The root server 504 has assigned to it all the capabilities that the system 500 will have, including all the untyped memory, endpoints, and the like. All spaces or nodes, assigned blocks of contiguous memory, pages of memory, and the like are assigned to the root server 504.

There are two main functions that are provided by the system 500: application instantiation and messaging between those applications. To provide for the instantiation and control of applications, the root server 504 creates an application manager 506. The application manager 506 is the primary resource of the system 500 used to establish and control applications. The root server 504 assigns a specific portion of its untyped memory as storage 505 to the application manager 506. In some examples, because the primary function of the root server to instantiate the application manager 506, the root server 504 assigned most of its untyped memory to the application manager 506. Once the application manager 506 is instantiated and assigned the capabilities by the root server 504, the application manager 506 commences setting up the system 500 to provide for applications. To instruct the application manager 506 on what to instantiate, the application manager 506 reads a manifest 508. The manifest 508 is a set of instructions that inform the application manager 506 of what to create, what capabilities are to be assigned to an entity when created, and the like. The manifest 508 is essentially the roadmap to create the functioning and operational version of the system 500. It should be noted that although the manifest 508 is shown as part of the application manager 506, like other modules described herein, the manifest 508 may be part of other systems, including part of the root server 504. The manifest 508 may include definitions of hardware and software used in the system 500. Various aspects of the manifest 508 are described in more detail in FIG. 6, below.

Returning to FIG. 5, in compliance with the manifest 508, the application manager 506 has instantiated application 510 and application 512. For example, the application 510 can be the client 102 of FIG. 1 and the application 512 can be the server 104A of FIG. 1. It should be noted that the manifest 508 may provide for fewer or more applications than the example applications 510 and 512 illustrated in FIG. 5. To provide for the capabilities of the applications 510 and 512, the storage 505 is partitioned to provide for contiguous blocks of the storage 505. In FIG. 5, untyped (UT) memory 514 is assigned to application 510, UT memory 516 is assigned to the application 512, and the UT memory 518 is assigned to an ethernet function 520.

As noted above, the other primary function of the system 500, along with use of applications, is the control of the communication between those application. Thus, when instantiating the application manager 506, the root server 504 also instantiates the message server 522. As described above, the message server facilitates communications between various applications, such as the client 102 and server 104A of FIG. 1. To facilitate that communication, applications have to make available for use part of their untyped memory. The application manager 522 requires resources from other entities in order to facilitate messages. For example, if in FIG. 5, the application 510 is the client 102 and the application 512 is the server 104A, to create the message chain of FIG. 3, the application 510 assigns the use of a portion 524 of the UT 514 of the application 510 to the message server 522. A pointer 526 is generated by the application 510 to node 528 of the message server 522. Thus, the message server 522 has access to use the portion 524. While use of the portion 524 is provided to the message server 522, the application 510 maintains the assignment of the portion 524, but cannot access or view what is written into the portion 524 by the message server 522. As shown in FIGS. 2 and 3, this portion 524 is used also by the server 104A. Thus, actions performed on behalf of the application 510 are permitted to the extent that the application 510 assigns the use of the resources needed to accomplish those tasks to the responding entities.

In FIG. 5, the root server 504 has also instantiated a manifest manager 530 and a scheduler 532. The manifest manager 530 is used by the root server 504 to update manifests, explained in more detail in FIG. 6, below. The scheduler 532 assists the application manager 506 in scheduling operations performed by various applications. As is understood, processor time, i.e. time taken by a processor to execute a thread and return a result, is a non-fungible resource. Even with multiple cores, a central processing unit only has a finite amount of time available to process threads. To facilitate the execution of threads, threads assigned to a particular application, such as the applications 510 and 512, are given a budget and/or priority by the manifest 508. For example, a thread of the application 510 may have more budget (i.e. processor time), but a thread of the application 512 may have a higher priority. Thus, the scheduler 532 may cause the thread of the application 512 to be executed first by a processor. Further, the manifest 508 may assign a particular core of the processor to which a thread is executed. For example, the thread of the application 510 may be a core 0 application, whereas the thread of the application 512 may be a core 1 application. Using the scheduler 532 in this manner increases the probability that a thread of any application will only be executed if the scheduler 532 imitates the thread. Further, because the manifest 508 has provided the time budget and priority for the various threads, the scheduler can increase the probability that the processor time is used in accordance with the manifest 508 and only as assigned to the applications 510 and 512.

The use of the scheduler 532 increases the stability of the system 500. However, the restriction of capabilities as discussed above can also increase the stability of the system. For example, the application 510 is the client 102 and the application 512 is the server 104A. In this example, when the application 510 stops, faults, or otherwise fails, a fault handler 534 receives a message from the application manager 506 that the application 510 has stopped or failed. The fault handler 534 is a thread of the application manager 506 and receives that message on an endpoint 536 assigned to the fault handler 534. The manner in which the application manager 506 handles the fault can be determined by the manifest 508. The manifest 508 may have instructions to the application manager 506 to use other untyped memory in the storage 505 to try to restart the application 510. The manifest 508 may have instructions to the application manager 506 to allow any applications handling requests by the application 510 to continue (as those responding entities are using the portion 524 that would otherwise be revoked).

If there are no fault instructions, or the fault instructions included in the manifest 508 state that the application manager 506 is to revoke the UT 514 if a fault occurs, the UT 514, including the portion 524, are erased, taking the application 510 and all of the capabilities the application 510 assigned to the application 512 and the message server 522 node 528 back to the application manager 506. The erasure may occur using various technologies, including but not limited to random data or memory zeroing. An erasing operation may also include a verification step whereby the erasing operation is verified and/or the UT 514 is verified. The contiguous memory block (UT 514) assigned to the application 510 is still assigned to the application 510. The application manager 506 receives word from the root server 504 through the fault handler 534 that the application 510 is to be restarted. The application manager 510 restarts the application 510 with the same UT 514 that the application 510 had before the application 510 stopped or faulted.

During this process, the application 512 continues to operate, essentially unaware that the application 510 stopped or faulted. Once the application manager 506 restarts the application 510 according to the manifest 508, the application manager 506 reestablishes communication connections between the application 510 and the message server 522 by assigning the use of the portion 524 to the message server 522 node 528. The message server 522 thereafter reestablishes, if lost, communications with the application 512. The storage 505 and the ethernet 520 did not restart and were unaffected by the failure and restart of the application 510. This process can also occur system wide. For example, if a central application like the application manager 506 stops or faults, the fault handler 534 can signal that to the root server 504. The root server 504 can clear out the storage 505, essentially erasing the current instantiation of the application manager 506 and all applications instantiated by the application manager 506, and thereafter restart the application manager 506 using the manifest 508.

A similar process to how the system 500 handles an application failure can be used to update an application, maintaining the stability of the system 500. In some conventional systems, when applications are instantiated, applications are instantiated in a dependent construct, meaning, that one application builds upon the other, which in turn builds upon another application. Thus, if one application in the chain is taken down, all the other applications after the application that is taken down often must be taken down as well, as their operability depends on the operability (e.g. memory location) of the preceding applications.

However, the system 500 of FIG. 5 is not a dependent construct. Rather, because each application is assigned a known, contiguous block of the storage 505, each application can be instantiated, stopped, and updated without effecting to a great degree other applications. The manner in which this is done is the use of the manifest 508. If a new version of the application 510 is determined to be needed or desired, a new manifest, manifest 538, is downloaded into the application manager 506. The application manager 506 analyzes the manifest 538 and determines that new code or an update is required for the application 510. The application manager 506 revokes (or clears) the UT 514 to the application 510. The application manager 506 loads the new code into the UT 514, restarts the application 510 using the new code, and reestablishes connections.

In another example, the new manifest 538 may be downloaded, but instead of taking down the application 510 to update the application 510, the manifest may instruct that a new application 510, application 510A, is to be used instead of the application 510. Thus, the manifest 538 may instruct the application manager to assign a new UT, the UT 518, to the application 510A and download the new code into that new UT 518. Once downloaded, the application 510 is brought offline and the application 510A is instantiated. The new application 510A assigns the use of portion 540 of the UT 518 to the message server 522 node 528 using pointer 542. The old application 510 UT 514 is erased, ready to be used by a new application.

In some examples, the manifest 508 can provide instructions to instantiate a capabilities server 542. In some examples, the capabilities server 542 is used to control and/or assign capabilities to one or more processors or operations in the system 500. For example, the capabilities server 542 can assign capabilities to the application 510, the application 512, and/or the message server 522. Further, it should be understood that various operations of the system 500 may be located on a single computer or across multiple computers, processors, or processor cores. For example, in some examples, the application 510 and the message server 522 may be instantiated and executed by one computer, core, or processor, and the application 512 may be instantiated and executed by a second computer, second core, or second processor.

From the discussed provided above, a manifest, such as the manifest 508 and the manifest 538, can play several roles within the system 500. The manifest 508 can inform the application manager 506 which applications to instantiate and the storage 505 assigned to each. The manifest 508 can inform the application manager 506 which applications can communicate with each other, creating the token table 322 of FIG. 3 or the communication authorization table 120 of FIG. 1. Manifests, however, can be of various types and configurations, as described in more detail in FIG. 6.

Figure 6:
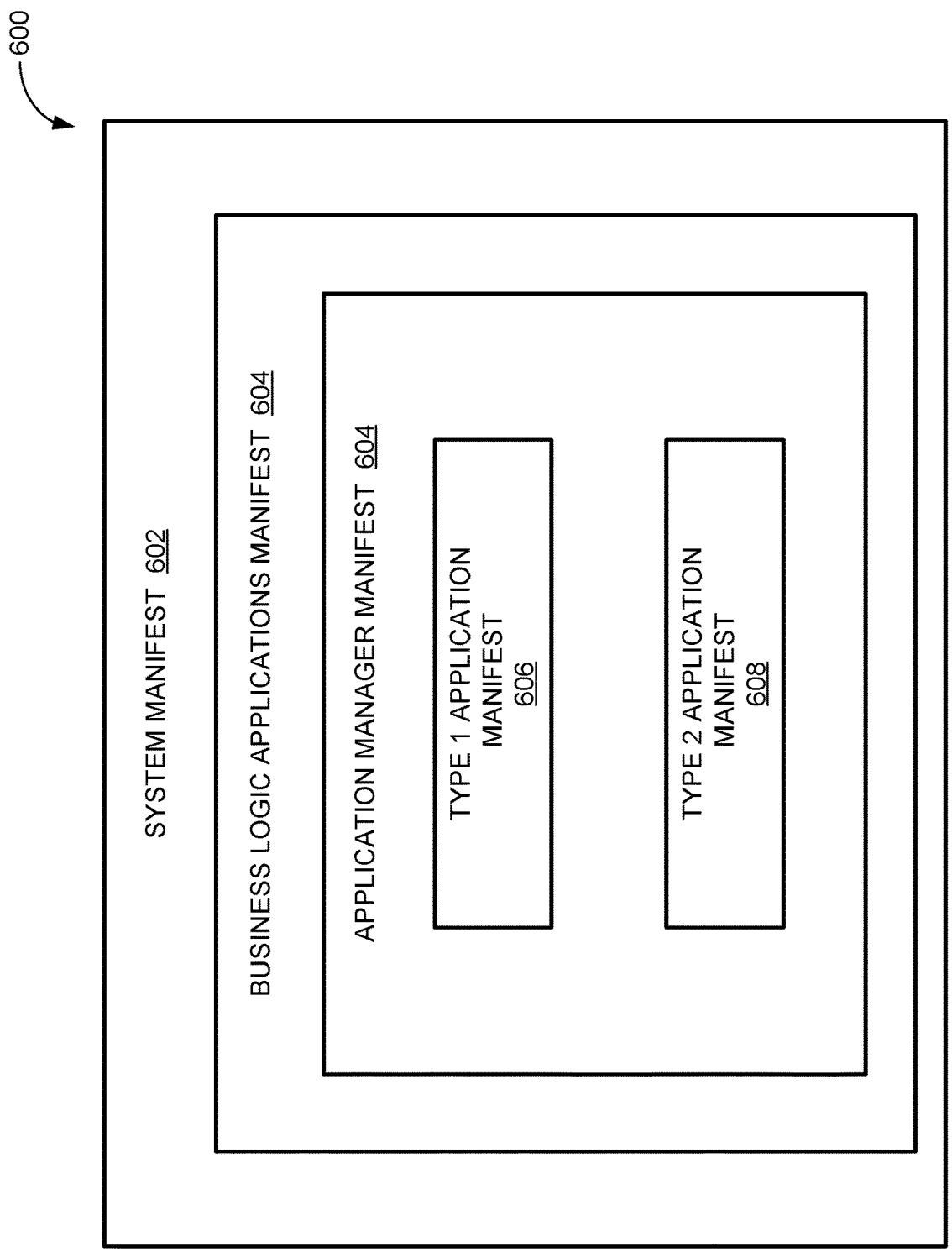
FIG. 6 is an example manifest configuration showing a nested manifest, in accordance with some examples of the present disclosure.

FIG. 6 is an example manifest configuration showing a nested manifest 600. The nested manifest 600, which may be stored in various locations in the storage of a computer, includes several manifests nested within the manifest 600. As used herein, "nested" means a part of a greater whole. For example, a system manifest 602 is nested within the manifest 600. The system manifest 602 can include instructions on how to turn on a computer, manage power, and the like. A business logic application manifest 604 may include instructions on which drivers to load into a machine, such as the drivers 416, and instructions on how to startup the message server 522. These applications are typically applications that are trusted but not verified. The manifest 600 further includes an application manager manifest 604, such as the manifest 508 of FIG. 5. In some examples, further manifests may be nested in other manifests that are nested themselves. For example, nested within the application manager manifest 604 are type 1 application manifest 606 and type 2 application manifest 608. These manifests 606 and 608 can be specific to certain types of applications, such as applications that may get updated on a regular basis reducing the need to update a larger manifest every time the applications need to be updated. A reason for using nested manifests may be the ability to create manifests for hardware (i.e. chips) and board support packagers. Thereafter, a third party can design manifests for applications using those known drivers, allowing a third party to only assign applications to the drivers.

Manifests, such as the manifest 600 of FIG. 6, are often signed cryptographically. In that manner, if cryptographically signed, the manifest 600 can be used to describe a computer running the manifest. The manifest 600 is the known configuration of the computer, which means a user can reason about the entire system layout. The manifest 600 gives information about the computer. Therefore, at all times, if the manifest 600 is known and signed, a computer can be described accurately. There is not entropy of the system (i.e. a continual randomization of system resources), and reducing or eliminating "bit rot," which is the slow deterioration in the performance and integrity of data stored on storage media. As used herein, a "signature" is a code, token, key, certificate or other object that is used to verify at least an aspect of software, such as the author.

The known aspect of the manifest 600 can be used when updating applications or making changes to a computer. A new manifest, such as the manifest 538, can be hashed along with all the other manifests into which the manifest 538 is nested. Once loaded into the system 500 and all updates are made, the manifest 538 that is onboard or loaded into the application manager 506 can be hashed against the hash of the manifest 538 prior to the loading to verify that the new manifest 538 matches the desired manifest 538 prior to loading. Further, hashing one or more of the manifests 600 can provide information as to the version the system 500 is operating, as each version of the manifest 600 will have a unique hash. Additionally, in the manifest 538, applications may also be downloaded with their own hashes as part of the manifest, thereby allowing applications to be verified.

Figure 7:
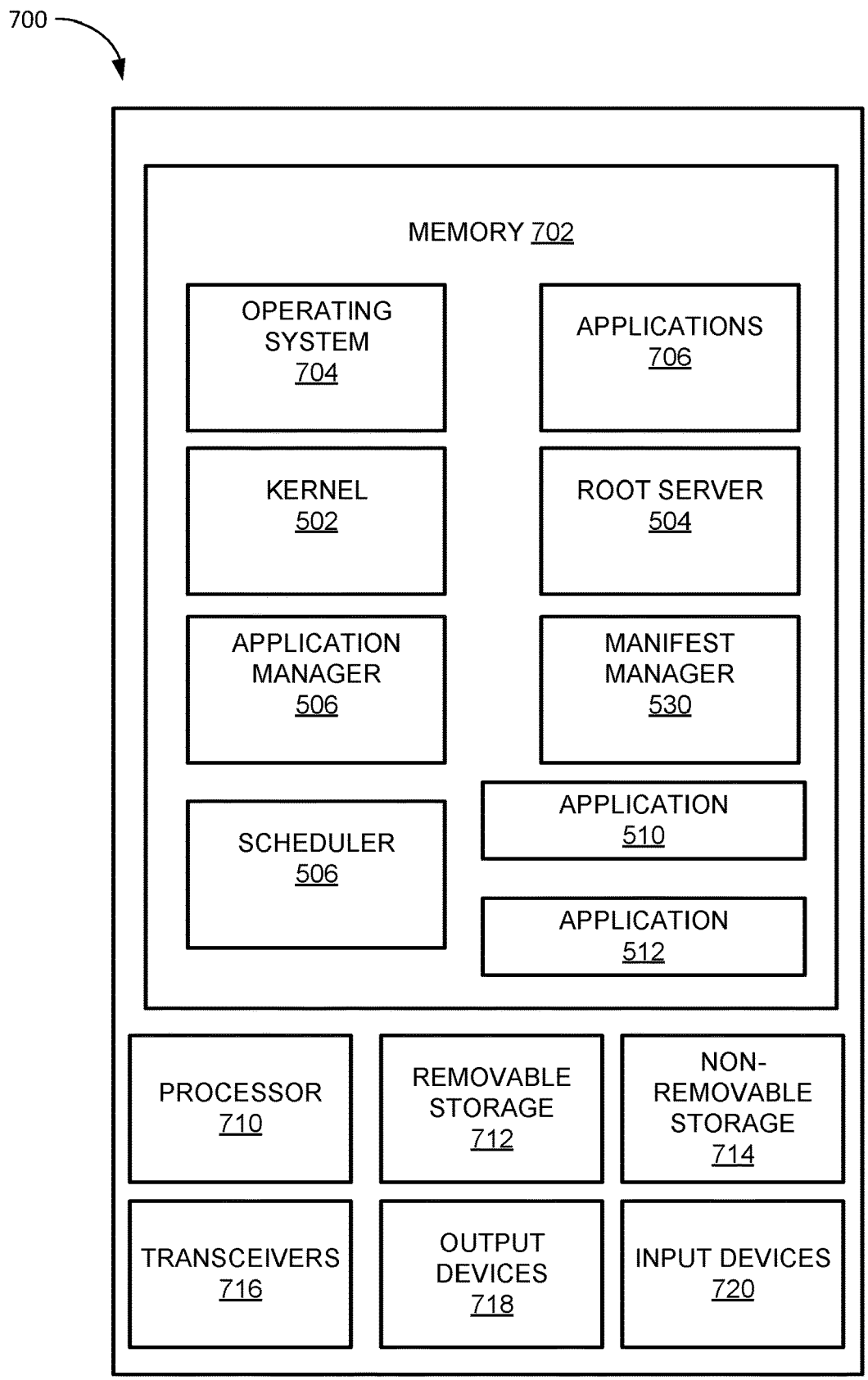
FIG. 7 depicts a component level view of the system 400 for use with the systems and methods described herein, in accordance with some examples of the present disclosure.

FIG. 7 depicts a component level view of the system 400 for use with the systems and methods described herein. The system 400 could be any device capable of communicating using a network. The system 400 can comprise several components to execute the above-mentioned functions. As discussed below, the system 400 can comprise memory 702 including an operating system (OS) 704 and one or more standard applications 706. The standard applications 706 can include many features common to user equipment such as, for example, applications initiated using voice commands (such as Internet searches, home appliance controls, and the like), music player, Internet radio, and other such applications. The standard applications 706 can include core applications such as the kernel 502 and the root server 504, among others. The system 400 can also comprise the application manager 506, the manifest manager 530, and the scheduler 532.

The system 400 can also comprise one or more processors 710 having one or more cores and one or more of removable storage 712, non-removable storage 714, transceiver(s) 716, output device(s) 718, and input device(s) 720. The system 400 can also include one or more cores from the one or more processors 710, whereby in some examples, the one or more processors 710 can be installed on different computer systems. In various implementations, the memory 702 can be volatile (such as random access memory (RAM)), non-volatile (such as read only memory (ROM), flash memory, etc.), or some combination of the two. The applications 510 and 512 can have assigned, contiguous blocks of the non-removable storage 714, the removable storage 712, and/or the memory 702. The memory 702 can also include the OS 704. The OS 704 varies depending on the manufacturer of the system 400. The OS 704 contains the modules and software that support basic functions of the system 400, such as scheduling tasks, executing applications, and controlling peripherals.

In some implementations, the processor(s) 710 can be one or more central processing units (CPUs), graphics processing units (GPUs), both CPU and GPU, or any other processing unit. The system 400 may also include additional data storage devices (removable and/or non-removable) such as, for example, magnetic disks, optical disks, or tape. Such additional storage is illustrated in FIG. 7 by removable storage 712 and non-removable storage 714.

Non-transitory computer-readable media may include volatile and nonvolatile, removable and non-removable tangible, physical media implemented in technology for storage of information, such as computer readable instructions, data structures, program modules, or other data. The memory 702, removable storage 712, and non-removable storage 714 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the system 400. Any such non-transitory computer-readable media may be part of the system 400 or may be a separate database, databank, remote server, or cloud-based server.

In some implementations, the transceiver(s) 716 include any transceivers known in the art. In some examples, the transceiver(s) 716 can include wireless modem(s) to facilitate wireless connectivity with other components (e.g., between the system 400 and a wireless modem that is a gateway to the Internet), the Internet, and/or an intranet. The transceiver(s) 716 can enable the system 400 to connect to multiple networks including, but not limited to 2G, 3G, 4G, 5G, and Wi-Fi networks. The transceiver(s) can also include one or more transceivers to enable the system 400 to connect to future (e.g., 6G) networks, Internet-of-Things (IoT), machine-to machine (M2M), and other current and future networks.

The transceiver(s) 716 may also include one or more radio transceivers that perform the function of transmitting and receiving radio frequency communications via an antenna (e.g., Wi-Fi or Bluetooth®). In other examples, the transceiver(s) 716 may include wired communication components, such as a wired modem or Ethernet port, for communicating via one or more wired networks. The transceiver(s) 716 can enable the system 400 to make audio and video calls, download files, access web applications, and provide other communications associated with the systems and methods, described above.

In some implementations, the output device(s) 718 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 718 can also include speakers, or similar devices, to play sounds or ringtones when an audio call or video call is received. Output device(s) 718 can also include ports for one or more peripheral devices, such as headphones, peripheral speakers, or a peripheral display.

In various implementations, input device(s) 720 include any input devices known in the art. For example, the input device(s) 720 may include a camera, a microphone, or a keyboard/keypad. The input device(s) 720 can include a touch-sensitive display or a keyboard to enable users to enter data and make requests and receive responses via web applications (e.g., in a web browser), make audio and video calls, and use the standard applications 406, among other things. The touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 720 and an output device 718.

Figure 8:
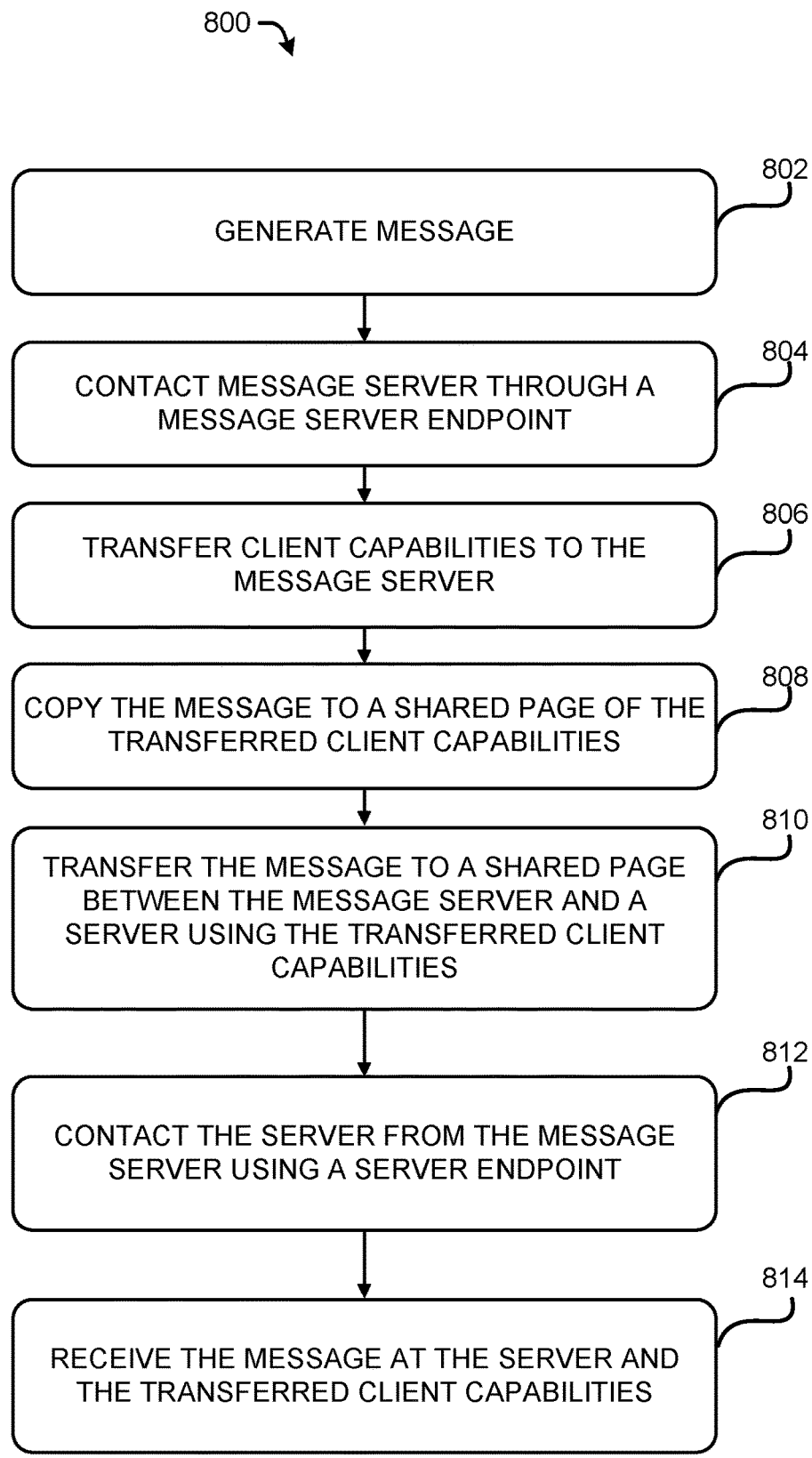
FIG. 8 is an illustrative process 800 for communicating from a client to a server in a capability-restricted system, in accordance with some examples of the present disclosure.

FIG. 8 is an illustrative process 800 for communicating in a capability-restricted system. The process 800 and other processes described herein are illustrated as example flow graphs, each operation of which may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Process 800 commences at operation 802, wherein the client 102 generates the message 116 for the server 104A. The message 116 can be of various types, such as requests for information, status updates, and the like. The message 116 further includes the token 324. The token 324 represents an authorization by the application manager 506 for the client 102 to communicate with the server 104A. The application manager 506 accesses the manifest 508. The manifest 508 includes instructions to the application manager 506 as to which applications can communicate with which other applications. In one example, the application manager 506 instantiates the token table 322. The token table 322 is used by the message server 522 to authenticate the authorization of the client 102 to communicate with the server 104A.

At operation 804, the client 102 contacts the message server 522 through the endpoint 318. The endpoint 318 is a communication portal used by two entities to communicate with each other. When the client 102 contacts the message server 522 through the endpoint 318, the thread 314 commences, causing the message server 522 to go from an idle state to an active state.

At operation 806, the client 102 transfers the use of the portion 524 of the UT 514 assigned to the client 102 to the node 528 of the message server 522. As discussed above, the system 500 and other examples described herein are capability-restricted systems. Thus, entities like the message server 522 and the server 104A can only perform operations on behalf of the client 102 to the extent that the client 102 gives the capabilities (i.e. the UT 524) to the message server 522 and the server 104A to do so. If the client 102 does not give the portion 524, or the portion 524 is insufficient, the message server 522 either will not pass along the message or the server 104A will not respond to the message.

At operation 808, the client 102 copies the message to the shared memory 308 of the shared node 304 between the message server 522 and the client 102. At operation 808, the client 102 is also placed in an idle state.

At operation 810, if the token 324 is authenticated by the message server 522 using the token table 322, the message server 522 copies the message from the shared memory 308 to the shared memory 310 of the shared node 306 between the message server 522 and the server 104A. The shared node 306 and other capabilities are part of the UT 514 of the client 102.

At operation 812, the message server 522 contacts the server 104A through the endpoint 320. This causes the message server 522 thread 314 to stop, placing the message server 522 in an idle state, and the thread 316 of the server 104A to start, starting the server 104A.

At operation 814, the server 104A copies or accesses the message in the shared memory 310, thus receiving the communication from the client 102. An example process of responding to the message is described in FIG. 9.

Figure 9:
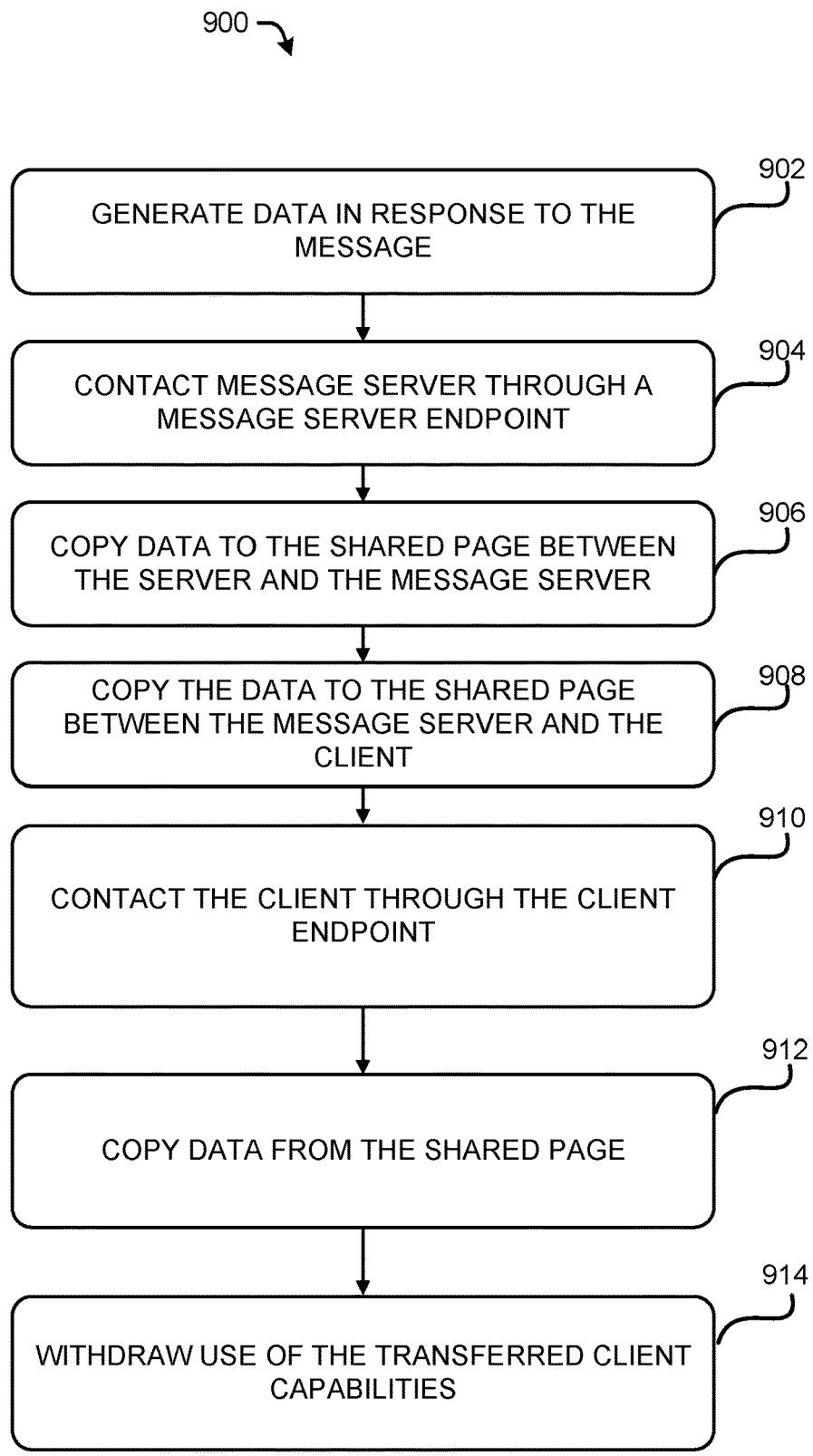
FIG. 9 is an illustrative process 900 for communicating from a client to a server in a capability-restricted system, in accordance with some examples of the present disclosure

FIG. 9 is an illustrative process 900 for responding to the message. From FIG. 8, the server 104A has processed the message and generated the data 114 at operation 902.

The process 900 continues to operation 904, where the server 104A contacts the message server 522 through the endpoint 320, changing the state of the message server 522 from idle to executing.

At operation 906, the server 104A copies the data 114 to the shared memory 310 of the shared node 306 between the message server 522 and the server 104A. At this point, the server 104A thread 316 enters an idle state, idling the server 104A.

At operation 908, the message server 522 copies the data 114 from the shared memory 310 of the shared node 306 between the message server 522 and the server 104A to the shared memory 308 of the shared node 304 between the message server 522 and the client 102A.

At operation 910, the message server 522 contacts the client 102 through the endpoint 318, notifying the client 102 of the presence of the data 114. The message server 522 thereafter enters an idle state and the client 102 enters from an idle state to an executing state.

At operation 912, the client 102 downloads the data 114 from the shared memory 308 to the node 202.

At operation 914, the client 102 revokes the transferred client capabilities.

Some aspects of the presently disclosed subject matter may be found by example in the following clauses:

Clause 1: A method, comprising: instantiating, in one or more systems, a client, a message server, and a server by an application manager, the client having a first contiguous block of untyped memory as a client node, the client node having access to untyped capabilities; generating, by the client, a message for a server, the message comprising a request to the server and a token; copying the message from the client node to a first shared node, the first shared node shared between the message server and the client and assigning a use of a set of capabilities from the client node to the message server, wherein the client retains ownership of the set of capabilities and the message server is given a use of the set of capabilities; communicating with the message server that the message is in the first shared node and that the use of the set of capabilities is given to the message server; verifying that the client has an authority to communicate with the server by verifying the token in a token table; and upon verifying that the client has the authority to communicate with the server: copying the message into a second shared node, the second shared node shared between the message server and the server; assigning the use of the set of capabilities to the server to allow the server to perform a function in response to the message; and communicating with the server that the message is in the second shared node for the server.

Clause 2: The method of paragraph 1, further comprising: copying data, created in response to the message, into the second shared node; and communicating with the message server that the data is in the shared second node.

Clause 3: The method of any of paragraphs 1 and 2, further comprising: copying the data in the second shared node into the first shared node; communicating with the client that the data is in the first shared node; copying the data to the client node; and revoking the use of the set of capabilities.

Clause 4: The method of any of paragraphs 1-3, wherein instantiating the client, the message server, and the server by the application manager comprises reading a manifest comprising a set of instructions for the application manager to instantiate the client and the server and a root server to instantiate the message server.

Clause 5: The method of any of paragraphs 1-4, wherein communicating with the message server that the message is in the first shared node and that the use of the set of capabilities is given to the message server comprises the client sending a first notification to a first endpoint, wherein the first notification commences a message server thread to commence the message server and idles a client thread to idle the client.

Clause 6: The method of any of paragraphs 1-5, wherein communicating with the server that the message is in the shared second node for the server and that the use of the set of capabilities is given to the server comprises the message server sending a second notification to a second endpoint, wherein the second notification commences a server thread to commence the server and idles a message server thread to idle the message server.

Clause 7: The method of any of paragraphs 1-6, wherein verifying that the client has the authority to communicate with the server by verifying the token in the token table comprises: reading the token, wherein the token is issued by the application manager according to instructions in a manifest; comparing the token to a stored token in the token table; and verifying the token if the token matches the stored token.

Clause 8: The method of any of paragraphs 1-7, further comprising issuing, by the message server, a second token to the server, the second token used to authenticate a response by the server for the client.

Clause 9: The method of any of paragraphs 1-8, further comprising accessing a scheduler to schedule at least: a first processor time for communicating with the message server that the message is in the first shared node and that the use of the set of capabilities is given to the message server; and a second processor time for communicating with the message server that the message is in the first shared node and that the use of the set of capabilities is given to the message server.

Clause 10: The method of any of paragraphs 1-9, wherein the scheduler further determines a first processor core or a second processor core to handle the first processor time and the second processor time.

Clause 11: The method of any of paragraphs 1-10, wherein at least one system of the one or more systems is mathematically verified.

Clause 12: The method of any of paragraphs 1-11, wherein at least one second system of the one or more systems is not mathematically verified.

Clause 13: The method of any of paragraphs 1-12, wherein a first system of the one or more systems is executed on a first core of a first processor.

Clause 14: The method of any of paragraphs 1-13, wherein a second system of the one or more systems is executed on a second core of the first processor.

Clause 15: The method of any of paragraphs 1-14, wherein a second system of the one or more systems is executed on a second core of a second processor.

Clause 16: A computer-readable storage medium having computer-executable instructions thereon, which when executed by one or more computers perform the following steps: instantiate, according to instructions from a first manifest, a client, a message server, and a server by an application manager, the client having a first one or more contiguous blocks of untyped memory as a client node, the client node having untyped capabilities; receive a notification of a second manifest to be downloaded, the second manifest comprising an updated version of the client; download the second manifest; erase the first one or more contiguous blocks of untyped memory while maintaining the message server and the server; load the updated version of the client into the erased first one or more contiguous block of untyped memory; and re-instantiate the updated version of the client in the first one or more contiguous block of untyped memory.

Clause 17: The computer-readable storage medium of paragraph 16, further comprising computer-executable instructions which when executed by the one or more computers perform a step to verify the manifest by verifying a signature of the manifest.

Clause 18: The computer-readable storage medium of any of paragraphs 16-17, further comprising computer-executable instructions which when executed by the one or more computers perform a step to compare a hash of the second manifest against a known hash of the second manifest to verify the second manifest downloaded is correct.

Clause 19: The computer-readable storage medium of any of paragraphs 16-18, wherein clearing the first contiguous block of untyped memory, while maintaining the message server and the server, erases data in the first contiguous block, the data comprises at least one pointer from the block of untyped memory to a second block of untyped memory of the server.

Clause 20: The computer-readable storage medium of any of paragraphs 16-19, wherein the step to erase the data thereby erases capabilities written in the block of untyped memory used by the server to service a request by the client.

Clause 21: The computer-readable storage medium of any of paragraphs 16-20, further comprising computer-executable instructions which when executed by the one or more computers perform a step to, in response to re-instantiating the updated version of the client in the first contiguous block of untyped memory, re-establishing a shared node between the updated version of the client and the message server.

Clause 22: A system comprising: a memory storing computer-executable instructions; and one or more processor cores in communication with the memory, the computer-executable instructions causing the one or more processors to perform acts comprising: instantiate a mathematically verified kernel; instantiate a root server and a message server; instantiate an application manager; download a manifest into the application manager, wherein the application manager executed the instructions in the manifest to: instantiate a first application and assign the first application a first block of contiguous untyped memory of the memory; instantiate a second application and assign the second application a second block of contiguous untyped memory of the memory; establish communication connections between the first application and the message server, and between the message server and the second application; and issue a token to the first application, wherein the token is used by the message server to verify that a message from the first application is authorized to be received by the second application.

Clause 23: The system of paragraph 22, further comprising computer-executable instructions to cause the processor to perform an act comprising instantiating a scheduler to instruct the application manager in scheduling operations performed by the first application or the second application.

Clause 24: The system of any of paragraphs 22-23, further comprising computer-executable instructions to cause the processor to perform an act comprising instantiating a manifest manager to update the manifest.

Clause 25: The system of any of paragraphs 22-24, further comprising computer-executable instructions to cause the processor to perform an act comprising instantiating a fault handler to detect a fault in the first application or the second application and handle the fault according to instructions in the manifest.

Clause 26: The system of any of paragraphs 22-25, further comprising computer-executable instructions to cause the processor to perform an act comprising instantiating a capabilities server to control capabilities of the first application, the second application, or the message server.

The presently disclosed examples are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method, comprising:
   instantiating, in one or more systems, a client, a message server, and a server by an application manager, the client having a first contiguous block of untyped memory as a client node, the client node having access to untyped capabilities;
   generating, by the client, a message for a server, the message comprising a request to the server and a token;
   copying the message from the client node to a first shared node, the first shared node shared between the message server and the client and assigning a use of a set of capabilities from the client node to the message server, wherein the client retains ownership of the set of capabilities and the message server is given a use of the set of capabilities;
   communicating with the message server that the message is in the first shared node and that the use of the set of capabilities is given to the message server;
   verifying that the client has an authority to communicate with the server by verifying the token in a token table; and
   upon verifying that the client has the authority to communicate with the server:
      copying the message into a second shared node, the second shared node shared between the message server and the server;
      assigning the use of the set of capabilities to the server to allow the server to perform a function in response to the message; and communicating with the server that the message is in the second shared node for the server.

2. The method of claim 1, further comprising:
copying data, created in response to the message, into the second shared node; and
communicating with the message server that the data is in the shared second node.

3. The method of claim 2, further comprising:
copying the data in the second shared node into the first shared node;
communicating with the client that the data is in the first shared node;
copying the data to the client node; and
revoking the use of the set of capabilities.

4. The method of claim 1, wherein instantiating the client, the message server, and the server by the application manager comprises reading a manifest comprising a set of instructions for the application manager to instantiate the client and the server and a root server to instantiate the message server.

5. The method of claim 1, wherein communicating with the message server that the message is in the first shared node and that the use of the set of capabilities is given to the message server comprises the client sending a first notification to a first endpoint, wherein the first notification commences a message server thread to commence the message server and idles a client thread to idle the client.

6. The method of claim 1, wherein communicating with the server that the message is in the shared second node for the server and that the use of the set of capabilities is given to the server comprises the message server sending a second notification to a second endpoint, wherein the second notification commences a server thread to commence the server and idles a message server thread to idle the message server.

7. The method of claim 1, wherein verifying that the client has the authority to communicate with the server by verifying the token in the token table comprises:
reading the token, wherein the token is issued by the application manager according to instructions in a manifest;
comparing the token to a stored token in the token table; and
verifying the token if the token matches the stored token.

8. The method of claim 1, further comprising issuing, by the message server, a second token to the server, the second token used to authenticate a response by the server for the client.

9. The method of claim 1, further comprising accessing a scheduler to schedule at least:
a first processor time for communicating with the message server that the message is in the first shared node and that the use of the set of capabilities is given to the message server; and
a second processor time for communicating with the message server that the message is in the first shared node and that the use of the set of capabilities is given to the message server.

10. The method of claim 9, wherein the scheduler further determines a first processor core or a second processor core to handle the first processor time and the second processor time.

11. The method of claim 1, wherein at least one system of the one or more systems is mathematically verified.

12. The method of claim 11, wherein at least one second system of the one or more systems is not mathematically verified.

13. The method of claim 1, wherein a first system of the one or more systems is executed on a first core of a first processor.

14. The method of claim 13, wherein a second system of the one or more systems is executed on a second core of the first processor.

15. The method of claim 13, wherein a second system of the one or more systems is executed on a second core of a second processor.

* * * * *